United States Patent [19]
Brug et al.

[11] 4,053,551
[45] Oct. 11, 1977

[54] METHODS OF RECOVERING TERBIUM OXIDE FROM A GLASS

[75] Inventors: James E. Brug, Toledo, Ohio; Eric X. Heidelberg, Lambertville, Mich.

[73] Assignee: Owens-Illinois, Inc., Toledo, Ohio

[21] Appl. No.: 719,769

[22] Filed: Sept. 2, 1976

[51] Int. Cl.$^2$ ............................................. C01F 17/00
[52] U.S. Cl. ........................................ 423/21; 106/52;
   252/301.4 F; 252/950; 423/263
[58] Field of Search .................................. 423/21, 263;
   252/301.4 F, 950

[56] References Cited

U.S. PATENT DOCUMENTS

| 2,849,286 | 8/1958 | Welt et al. | 423/21 |
| 3,506,585 | 4/1970 | Otsuka et al. | 423/21 |
| 3,944,329 | 3/1976 | Lee et al. | 252/301.4 F |

FOREIGN PATENT DOCUMENTS

| 866,715 | 4/1961 | United Kingdom | 423/21 |

OTHER PUBLICATIONS

Vickery, "Chemistry of the Lanthanons", Academic Press, Inc., May, 1953, pp. 73-75, 128.

*Primary Examiner*—Herbert T. Carter
*Attorney, Agent, or Firm*—Charles S. Lynch; E. J. Holler

[57] ABSTRACT

A method for recovering $Tb_4O_7$ from a glass containing terbium oxide is disclosed, the method including the steps of:

I. fusing the glass containing terbium oxide with NaOH to provide a solid fusion product;
II. slurrying the fusion product of Step I to disperse solid particles of $Tb_4O_7$ and any $Li_2SiO_3$ present and to dissolve any $Al_2O_3$, NaOH and $Na_2SiO_3$ to thereby separate the same from the solid particles of $Tb_4O_7$;
III. reacting the solid particles of $Tb_4O_7$ of Step II with $HNO_3$ to provide $Tb(NO_3)_3$;
IV. reacting the $Tb(NO_3)_3$ with oxalic acid to form $Tb_2(C_2O_4)_3$; and
V. firing the $Tb_2(C_2O_4)_3$ to form $CO_2$ and solid $Tb_4O_7$ to that is recovered from the glass.

6 Claims, No Drawings

METHODS OF RECOVERING TERBIUM OXIDE FROM A GLASS

INVENTION

The present invention is directed to recovering $Tb_4O_7$ from a glass containing terbium oxide and, more particularly, is directed to recovering $Tb_4O_7$ from a glass containing terbium oxide and contaminated with small amounts of platinum.

The present invention provides a convenient and economical method of obtaining $Tb_4O_7$, which is costly and often difficult to obtain.

It is an object of the present invention to provide a method of recovering $Tb_4O_7$ from a laser glass containing terbium oxide and small contaminating amounts of platinum.

It is an object of the present invention to provide a method of recovering $Tb_4O_7$ from a laser glass containing terbium oxide, the method comprising the steps of:

I. fusing the glass containing terbium oxide with NaOH to provide a solid fusion product;

II. slurrying the fusion product of Step I to disperse solid particles of $Tb_4O_7$ and to dissolve any $Al_2O_3$, NaOH and $Na_2SiO_3$ present in the fusion product to thereby separate from the other ingredients solid particles of $Tb_4O_7$ + any $Li_2SiO_3$ formed;

III. reacting the solid particles of $Tb_4O_7$ separated from the slurry of Step II with $HnO_3$ to form $Tb(NO_3)_3$;

IV. reacting $Tb(NO_3)_3$ with oxalic acid to form terbium oxalate; and

V. firing the terbium oxalate to form solid $Tb_4O_7$ and $CO_2$, which $CO_2$ volatilizes off as a gas and is separated from the solid $Tb_4O_7$.

These and other objects will be apparent from the specification that follows and the appended claims.

The present invention provides an economical and convenient method for recovering $Tb_4O_7$ from a glass containing terbium oxide, including glass such as laser glass having contaminating amounts of platinum. The method comprises the steps of:

I. fusing the glass containing terbium oxide with NaOH to provide a solid fusion product;

II. separating the solid particles of $Tb_4O_7$ from any $Al_2O_3$, NaOH and $Na_2SiO_3$ present by slurrying the fusion product of Step I to provide solid particles of $Tb_4O_7$ and any $Li_2SiO_3$ present;

III. reacting the solid particles of $Tb_4O_7$ of Step II with $HNO_3$ to provide terbium nitrate;

IV. reacting terbium nitrate with oxalic acid to form terbium oxalate as a reaction product thereof; and V. firing the terbium oxalate to form $CO_2$, which is volatilized off as a gas and to form solid $Tb_4O_7$ that is recovered. The fusing of Step I is suitably carried out at about 500° C.

The methods of this invention were developed in one preferred embodiment for the recovery of terbium oxide from a laser or Faraday rotator glass having contaminated amounts of platinum, the recovered terbium oxide then being advantageously available for subsequent reuse. The methods of this invention are convenient and advantageous.

In one preferred embodiment of the present invention, the laser glass or light rotating glass for use in a Faraday rotator device is a glass containing about 41% by weight of terbium oxide, the remainder of the composition containing silica, alumina and lithium oxide. A suitable light-rotating glass containing terbium oxide is one of the lithia-silica-terbia systems generally comprising, on a mole basis, about 61–80 mole percent $SiO_2$, 15–27.5 mole percent $Li_2O$, 3–9 mole percent terbium oxide, and optionally, up to about 3 mole percent of $R_2O_3$, such as $La_2O_3$, $Al_2O_3$ or $B_2O_3$, and optionally, minor amounts of $Na_2O$, $K_2O$ or CaO, namely, 0–10 $Na_2O$, 0–5 $K_2O$ and 0–5 CaO. The sum of $Li_2O$ + $Na_2O$ + $K_2O$ + CaO should not generally be greater than about 32.5 mole percent.

A suitable glass for a Faraday rotation device is described in U.S. Pat. No. 3,484,152 to Robinson. One suitable terbium oxide-alumina silicate glass, as therein disclosed, is one containing in weight percent about 12% $Al_2O_3$, 25% $SiO_2$, 4% MgO, 1% $Pr_2O_3$ and 58% $Tb_2O_3$.

In accordance with the specific embodiment of the present invention, the glass containing 61 mole percent $SiO_2$, 27.5 mole percent $Li_2O$, 2.5 mole percent $Al_2O_3$ and 9 mole percent $Tb_4O_7$ is powdered and fused with NaOH to provide a solid fusion product. The resultant fusion is slurried in water to disperse solid particles of $Tb_4O_7$ and $Li_2SiO_3$, and to dissolve the alumina, NaOH and $Na_2SiO_3$ to thereby separate the latter ingredients from the solid particles of terbium oxide. Thereafter, solid particles of terbium oxide are reacted with $HNO_3$ to provide $Tb(NO_3)_3$, the insoluble solid products of terbium oxide being reslurried in water and the pH adjusted to 2 with nitric acid. The resulting reaction product is terbium nitrate, which is a soluble salt, and another reaction product is a stable silica salt. Thereafter, the terbium nitrate is reacted with oxalic acid to form $Tb_2(C_2O_4)_3$. Thus the oxalic acid forms a complex, insoluble salt with terbium, which is filtered free of the silica. The terbium oxalate is fired in a 1,000° C. furnace to provide the recovered terbium oxide. The terbium oxide is reported as $Tb_4O_7$, it generally being a mixture of $Tb_2O_3$ and $TbO_2$.

The resultant recovered terbium oxide was used in a laser glass composition, as above described, to provide a laser glass which was suitable. The resultant laser glass of a lithia-silica-terbia system had a good balance of properties, including a high Verdet constant, good light transmission, good melt properties, high damage threshold, and good forming properties, including a relatively wide working temperature range at approximately $log_4$ viscosity, being relatively seed-free and easily homogenized.

In accordance with the present invention, it is costly and sometimes difficult to obtain terbium oxide. In the present process, a sometimes scarce material is obtained from glass, which is, as in the case with the light rotating glass, contaminated with platinum, rending it useless. In accordance with the present invention, the glass is fused with sodium hydroxide, which fusion breaks the composition into single components which can be separated from one another. These separations are made by controlling the pH in the subsequent isolation steps.

What is claimed is:

1. A method of recovering $Tb_4O_7$ from a glass containing terbium oxide, the method comprising the steps of:

I. fusing the glass containing $SiO_2$, $Li_2O$, $Al_2O_3$ and terbium oxide with NaOH to provide a solid fusion product;

II. slurrying in water the fusion product of Step I to disperse solid particles of $Tb_4O_7$ and $Li_2SiO_3$ and dissolving the $Al_2O_3$, NaOH and $Na_2SiO_3$ to thereby separate said $Al_2O_3$, NaOH and $Na_2SiO_3$ from the solid particles of $Tb_4O_7$;

III. reacting the solid particles of $Tb_4O_7$ separated from the slurry of step II with $HNO_3$ to provide $Tb(NO_3)_3$;

IV. reacting $Tb(NO_3)_3$ with oxalic acid to form $Tb_2(C_2O_4)_3$; and

V. firing $Tb_2(C_2O_4)_3$ to form $Tb_4O_7$ and $CO_2$ to thereby recover solid $Tb_4O_7$.

2. A method as defined in claim 1 in which the glass composition is a light rotating glass.

3. A method as defined in claim 1 in which the glass has the following approximate composition:

| Ingredients | Mole Percent |
| --- | --- |
| $SiO_2$ | 61 – 80 |
| $Li_2O$ | 15 – 27.5 |
| $Na_2O$ | 0 – 10 |
| $K_2O$ | 0 – 5 |
| CaO | 0 – 5 |
| $Al_2O_3$ | 0 – 3 |
| $B_2O_3$ | 0 – 3 |
| $La_2O_3$ | 0 – 3 |
| Terbium Oxide | 3 – 9 | wherein the sum of $Li_2O$ + $Na_2O$ + $K_2O$ + CaO is no more than about 32.5 mole percent.

4. A method as defined in claim 1 in which the reaction of Step III is at a pH of about 2.

5. A method as defined in claim 1 in which the firing temperature of Step V is about 1,000° C.

6. A method as defined in claim 1 in which the fusing of Step I is at about 500° C.

* * * * *